Patented Oct. 13, 1953

2,655,494

UNITED STATES PATENT OFFICE 2,655,494

POLYMERIZABLE ACRYLONITRILE COMPOSITIONS AND POLYMERIZATION PRODUCTS THEREOF

Edward L. Kropa, Old Greenwich, Conn., and Earl W. Malmberg, Dublin, Ohio, assignors to American Cyanamid Company, New York, N. Y., a corporation of Maine No Drawing. Application December 29, 1951, Serial No. 264,273

14 Claims. (Cl. 260—77.5)

This invention relates to new and useful compositions of matter, and more particularly is concerned with polymerizable and polymerized acrylonitrile compositions. Still more particularly the present invention is directed to polymerizable compositions comprising (1) acrylonitrile and (2) a compound represented by the general formula

I

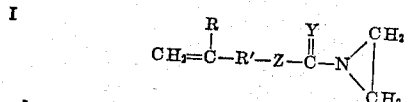

where R represents a member of the class consisting of hydrogen and the methyl radical, R' represents a divalent hydrocarbon radical, Z represents a member of the class consisting of oxygen and the imino (—NH—) radical, and Y represents a member of the class consisting of oxygen and sulfur, the compound of (2) constituting from about 0.4% to about 35% by weight of the total amount of (1) and (2); and to products comprising such polymerized compositions, e. g., a copolymer of copolymerizable ingredients including (1) acrylonitrile and (2) a compound of the kind embraced by Formula I in a weight ratio of from about 1% to about 15% (more particularly from about 2% to about 10%) of the latter, based on the weight of the total amount of (1) and (2). The scope of the invention also includes method features whereby new and useful synthetic compositions are produced.

Illustrative examples of divalent hydrocarbon radicals represented by R' in the above formula are: divalent aliphatic, e. g., ethylene, propylene (trimethylene), propenylene, butylene, isobutylene, pentylene, isopentylene, etc., including divalent cycloaliphatic, e. g., cyclopentylene, cyclohexylene, cyclohexenylene, cycloheptylene, cyclopentenylene, etc.; divalent aromatic, e. g., phenylene, xenylene, naphthylene, etc.; divalent aliphatic-substituted aromatic, e. g., 2,4-tolylene, ethyl-2,5-phenylene, isopropyl-3,4-phenylene, 1-butyl-2,4-naphthylene, etc.; divalent aromatic-substituted aliphatic, e. g., phenylethylene, phenylpropylene, naphthylisobutylene, xylylene, alpha-(4-tolylene) beta'-butyl, etc.; radicals that may be classed either as divalent aliphatic-substituted aromatic or divalent aromatic-substituted aliphatic, e. g., 4,alpha-tolylene, 3,beta-phenyleneethyl, 4,alpha-xylylene, 2,gamma-phenylenebutyl, etc. Preferably R' represents a divalent hydrocarbon radical (e. g., a divalent saturated aliphatic or a divalent aromatic hydrocarbon radical) containing from 1 to 7 carbon atoms, inclusive.

More specific classes of compounds embraced by Formula I are compounds of the following classes:

II 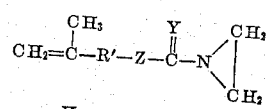

III 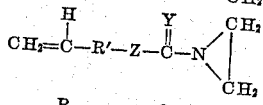

IV 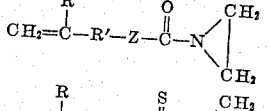

V 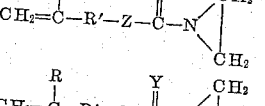

VI 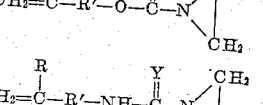

VII 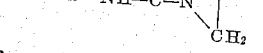

In the above formulas R, R', Z and Y have the same meanings as given above with reference to Formula I. More specific examples of compounds embraced by the above formulas are: allyl-N,N-ethylene carbamate, methallyl-N,N-ethylene carbamate, N-allyl-N',N'-ethyleneurea, N-allyl-N',N'-ethylenethiourea, N-isopropenylphenyl-N',N'-ethyleneurea, allyl-N,N-ethylene thiocarbamate, methallyl-N,N-ethylene thiocarbamate, N-methallyl - N',N' - ethyleneurea, N-methallyl - N',N'-ethylenethiourea, N-vinylphenyl-N',N'-ethyleneurea and N-vinyltolyl-N',N'-ethylenethiourea. Other examples will be apparent to those skilled in the art from Formulas I to VII, inclusive, and from the definitions of R, R', Z and Y appearing in these formulas.

It is one of the primary objects of the present invention to prepare a new class of copolymers for use in industry, for example in molding, casting, coating, laminating and adhesive applications.

Another and important object of the invention is the production of new acrylonitrile copolymer compositions which are more readily dyed, especially with acid dyes, than homopolymeric acrylonitrile or many of the copolymers of acrylonitrile and another monomer or monomers that were known or suggested prior to our invention.

Another object of the invention is to prepare such copolymers which can be spun or otherwise shaped to form filaments, tapes, ribbons, rods, tubes, sheets, etc., and the shaped articles then dyed either before or after having been oriented to improve their useful properties.

Other objects of the invention will be apparent to those skilled in the art from the description and examples which follow.

These objects are accomplished, in general, by preparing a copolymer of copolymerizable ingredients comprising acrylonitrile and a compound (or a plurality of compounds) of the kind embraced by Formula I. The copolymer advantageously is produced, for instance, by polymerizing, in a liquid medium in which the polymerizable ingredients are inert and with the aid of a polymerization catalyst (or catalysts), a mixture of comonomers including acrylonitrile and one or more compounds of the kind covered by Formula I; and, at the end of the polymerization period, isolating the resulting copolymer. The compound of the kind embraced by Formula I which is copolymerized with acrylonitrile in practicing our invention is employed in an amount corresponding to from 0.4 or 0.5% to 30 or 35%, preferably from about 1% to about 15%, by weight of the total amount of the said compound and acrylonitrile. The use of higher proportions of the compound embraced by Formula I, for example 50% (or in some cases even as much as 75%), of the said compound based on the total weight of such compound and acrylonitrile, is not precluded but no particular advantages appear to accrue therefrom. In general, largely for economic reasons, no more of the ethyleneurea or ethylene carbamate compound should be employed as a comonomer with acrylonitrile than is required in order to obtain the desired results, for example improved dyeability, especially toward acid dyes.

Any suitable means may be used in effecting the copolymerization of the acrylonitrile with the compound embraced by Formula I. Heat, light, or both heat and light, with or without a polymerization catalyst, can be used. A polymerization catalyst preferably is employed in order to shorten the period of time required for polymerization of the mixture of ingredients comprising acrylonitrile and the cyclic ethylene compound. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propinoyl peroxide, lauroyl peroxide, stearoyl peroxide, malonyl peroxide, succinyl peroxide, phthaloyl peroxide, benzoyl peroxide, etc.; fatty oil acid peroxides, e g., coconut oil acid peroxides, etc.; unsymmetrical or mixed diacyl perides, e. g., acetyl benzoyl peroxide, propionyl benzoyl peroxide, etc; terpene oxides, e. g., ascaridole, etc.; and salts of inorganic per-acids, e. g., ammonimum persulfate, sodium persulfate, potassium persulfate, sodium percarbonate, potassium percarbonate, sodium perborate, potassium perborate, sodium perphosphate, potassium perphosphate, etc. Other examples of organic peroxide catalysts that can be employed are the following:

Tetralin hydroperoxide
tert.-butyl diperphthalate
Cumene hydroperoxide
tert.-butyl perbenzoate
2,4-dichlorobenzoyl peroxide
Urea peroxide
Caprylyl peroxide
p-Chlorobenzoyl peroxide
2,2-bis(tert.-butyl peroxy) butane
Hydroxyheptyl peroxide
Diperoxide of benzaldehyde Other so-called "free radical" types of catalysts, e. g., $\alpha,\alpha'$-azodiisobutyronitrile, also can be used to accelerate polymerization.

If desired, the mixture of monomers can be polymerized in emulsion or in solution state to yield a copolymer. Good results are obtained by effecting copolymerization while the monomers are dissolved in a suitable solvent, e. g., aqueous alcohol, benzene, toluene, xylene, etc. Preferably the copolymerization reaction is carried out in a liquid medium in which the monomeric mixture is soluble but the copolymer is insoluble.

The polymerization also can be effected by conventional bulk polymerization technique, in the presence or absence of a solvent capable of dissolving the monomeric mixture and in which the latter preferably is inert; or by conventional bead polymerization methods. The polymerization of the mixture of monomers can be effected by a continuous process as well as by a batch operation.

The concentration of the catalyst is relatively small, e. g., from, by weight, about 1 part of catalyst per 1000 parts of the monomeric mixture to about 3 or 4 parts of catalyst per 100 parts of the mixture of monomers.

The temperature of polymerization of the polymerizable composition comprising acrylonitrile and the cyclic ethylene compound in the proportions specified in the first paragraph of this specification can be varied over a wide range, up to and including or slightly above the boiling point (at atmospheric pressure) of the monomeric mixture. In most cases, the polymerization temperature will be within the range of about 20° or 30° C., preferably at least 35° or 40° C., up to the boiling temperature of the mixture of monomers, depending, for example, upon the particular catalyst, if any, used, the rapidity of polymerization wanted and other influencing factors. The use of polymerization temperatures substantially above the boiling point of the mixture of monomers is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

If desired, the monomers may be copolymerized in the presence of a plasticizer for the copolymer. Other copolymerization methods, however, also may be employed, e. g., methods such as those described in U. S. Patents 2,140,048, 2,160,054, 2,194,354, 2,333,635, 2,436,926 and British patent 586,881 with reference to the production of other polymerization products. The copolymers of ingredients comprising combined acrylonitrile and cyclic ethylene compound of the kind embraced by Formula I may be produced in various molecular weights, depending, for instance, upon the particular polymerization conditions employed but ordinarily are within the range of about 15,000 to about 300,000 or higher as calculated from viscosity measurements using the Staudinger equation (reference: U. S. Patent No. 2,404,713).

If the copolymerization reaction is carried out while the mixed monomers are dissolved or dispersed in a liquid medium, the resulting copolymer then is separated from the said medium by any suitable means, e. g., by filtration, centrifuging, solvent extraction, etc.

The compounds of the kind embraced by Formula I and which are used in practicing the present invention can be prepared, for example, by methods such as are described below with particular reference to the preparation of certain specific compounds covered by Formula I.

EXAMPLE 1

*Preparation of N-allyl-N',N'-ethyleneurea*

To a 3-necked reaction vessel fitted with a mechanical stirrer, reflux condenser and dropping funnel is added a solution of 5.81 g. of ethyleneimine dissolved in 75 ml. of hexane. The reaction vessel is immersed in a water bath which is maintained at 30–35° C. during the reaction period. To the ethyleneimine solution is added, over a period of 70 minutes, 10.8 g. of allyl isocyanate dissolved in 25 ml. hexane. The reaction mass is stirred during the addition of the allyl isocyanate solution to the ethyleneimine solution and for one hour and fifty minutes thereafter. N-allyl-N',N'-ethyleneurea separates out as a cloudy oil which becomes clear on standing and can be separated from the hexane.

EXAMPLE 2

*Preparation of N-allyl-N',N'-ethylenethiourea*

One-half mole (21.5 g.) of ethyleneimine is dissolved in 200 ml. of benzene, and the resulting solution is cooled in an ice bath. To the cold solution is added a solution of 50 g. (0.5 mole) of allyl isothiocyanate dissolved in 50 ml. of benzene over a period of 35 minutes. The benzene solution of the allyl isothiocyanate is cooled to 5–10° C. prior to its addition to the ethyleneimine solution. The ice bath is removed, and the mixture is stirred at room temperature (20–30° C.) for 24 hours, yielding a clear, light-orange solution. Most of the benzene is distilled from the reactions mass under reduced pressure. The liquid residue is slurried in 100 ml. of hexane to remove the remaining benzene. Separation of the lower layer gives 71.8 g. (a quantitative yield) of N-allyl-N',N'-ethylenethiourea as an orange-colored oil.

The above reaction can be illustrated by the following equation:

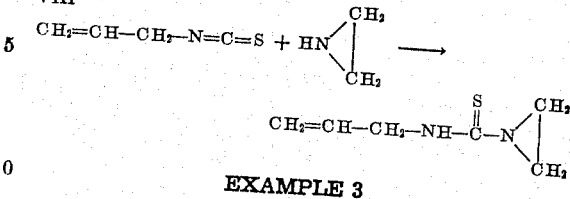

EXAMPLE 3

*Preparation of allyl-N,N-ethylene carbamate*

A solution of 60.2 g. (0.5 mole) of allyl chlorocarbonate dissolved in 200 ml. of benzene, which solution is at a temperature of 4–5° C., is added over a period of 70 minutes to a stirred solution of 21.5 g. (0.5 mole) of ethyleneimine and 50.5 g. (0.5 mole) of triethylamine dissolved in 300 ml. of benzene. The triethylamine hydrochloride precipitates copiously. The reaction mass is allowed to stand for about 16 hours at room temperature. The triethylamine hydrochloride is filtered off, after which the benzene is distilled from the filtrate under reduced pressure on a steam bath. The residue is a mobile, yellow liquid which is distilled under water-pump pressure. Allyl-N,N-ethylene carbamate is obtained as a colorless, mobile liquid having a boiling point of 83–86° C. under a pressure of 22 mm. of mercury. It is obtained in a yield corresponding to 78.9% of the theoretical yield.

The above reaction can be illustrated by the following equation wherein "TEA" represents triethylamine.

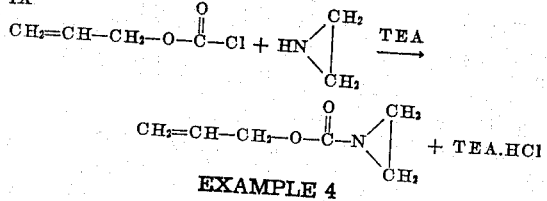

EXAMPLE 4

*Preparation of N-isopropenylphenyl-N',N'-ethyleneurea*

A solution of 19 g. of ethyleneimine dissolved in 100 g. of benzene is placed in a 3-necked reaction vessel provided with a mechanical stirrer, dropping funnel and reflux condenser. While cooling the reaction vessel containing the benzene solution of the ethyleneimine in an ice bath, 70 g. of isopropenylphenyl isocyanate dissolved in 50 g. of benzene is added dropwise over a period of 1¾ hours. The solid, white reaction produce comprising N-isopropenylphenyl-N',N'-ethyleneurea is filtered off, washed first with about 45 g. of benzene and then with about 150 g. of hexane, after which it is allowed to air-dry for about 16 hours. The yield is quantitative (79 g.).

The above reaction can be illustrated by the following equation:

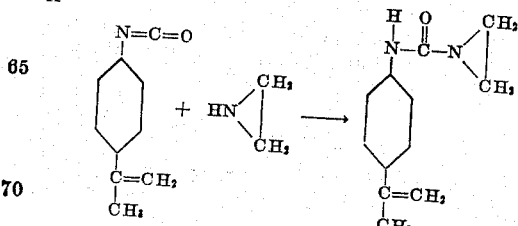

In order that those skilled in the art may better understand how the present invention can be carried into effect, using compounds of the kind embraced by Formula I, the following examples

EXAMPLE 5

This example illustrates the preparation of homopolymeric acrylonitrile, which is subsequently employed in comparative tests with certain of the copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of pre-purified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium meta-bisulfite, each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Büchner funnel, and washed with 1000 parts of distilled water followed by about 160 parts of methanol. The polymer is dried in an oven at 70° C. for about 16 hours. The yield of dry polyacrylonitrile, which is white, amounts to 48 parts.

EXAMPLE 6

This example illustrates the production of a copolymer of acrylonitrile and allyl-N,N-ethylene carbamate.

Fifteen (15) g. of acrylonitrile is placed in a 2-necked reaction vessel to which is then added 70–80 mg. of allyl-N,N-ethylene carbamate, followed by 300 ml. of water in small portions with intermittent stirring. Intermittent stirring is continued and in a short period a single phase results. Nitrogen gas is passed over the surface of the solution, and there is then added a solution of 0.23 g. of sodium meta-bisulfite dissolved in 8 ml. of water and a solution of 0.6 g. of potassium persulfate dissolved in 17 ml. of water. The reaction mass is stirred while maintaining it at a temperature of 30–33° C., and in a short period copolymerization begins as evidenced by coagulation of the mixed monomers. Stirring and heating are continued for a total of 2 hours, at the end of which period the coagulated copolymer is filtered off, washed first with water and then with methanol, after which the filter cake is compressed and allowed to dry first in air and then in a 70° C. oven to a constant weight. The resulting copolymer is tested for its dyeability as described in a later example.

EXAMPLE 7

This example illustrates the preparation of a copolymer of acrylonitrile and N-isopropenylphenyl-N',N'-ethyleneurea.

| | Parts |
|---|---|
| N - Isopropenylphenyl - N',N' - ethyleneurea | 0.2 |
| Acrylonitrile | 30.0 |
| Ethyl alcohol | 120.0 |
| Water | 400.0 |
| Sodium meta-bisulfite | 1,154 |
| Potassium persulfate | 1.4 |

[1] These are dissolved in a total of 50 parts of water.

The mixture of the above ingredients is stirred at 50° C. for a total of 5 hours at the end of which period a copolymer of the acrylonitrile with the cocyclic ethylene compound has formed. The copolymer is filtered off, washed with water and then with methanol. Thereafter it is dried first in air and then in a 70° C. oven to a constant weight. The yield of copolymer is 76% of the theoretical. It is tested for its dyeability as described in a later example.

EXAMPLE 8

This example illustrates the preparation of a copolymer of acrylonitrile and N-allyl-N',N'-ethyleneurea.

| | Parts |
|---|---|
| N-allyl-N',N'-ethyleneurea | 0.24 |
| Acrylonitrile | 30.0 |
| Water | 600.0 |
| Sodium meta-bisulfite | 1,922 |
| Potassium persulfate | 12.4 |

[1] These are dissolved in a total of 50 parts of water.

Exactly the same procedure is followed as described under Example 7 with the exception that the time of polymerization is about 7 hours and the drying is carried out for about 16 hours at room temperature and then in a 90° C. oven to a constant weight. The yield of copolymer of acrylonitrile and N-allyl-N',N'-ethyleneurea is about 83% of the theoretical. It is tested for its dyeability as described in the next example.

EXAMPLE 9

Samples of the homopolymeric acrylonitrile of Example 5 and of the copolymers of Examples 6, 7 and 8 are subjected to the following dye test:

A sample (5 parts) of the dry polymer or copolymer is added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the polymerization product is filtered off and washed with hot water until the water is free of dye. The copolymers of Examples 6, 7 and 8 are dyed blue, whereas, the homopolymeric acrylonitrile of Example 5 fails to absorb any dye. The advantage of modifying an acrylonitrile polymerization product by replacing a part, more particularly from about 0.4% to about 30 or 35% or more, and specifically from 1 or 2% to 10 or 15% of the initial acrylonitrile, with a compound of the kind embraced by Formula I, thereby to obtain a copolymeric acrylonitrile substance of improved dyeability, is therefore quite apparent.

EXAMPLE 10

| | Parts |
|---|---|
| Acrylonitrile | 90 |
| N-Isopropenylphenyl-N',N'-ethyleneurea | 10 | are heated together on a steam bath under anhydrous reflux conditions, yielding a copolymer of the above comonomers.

EXAMPLE 11

| | Parts |
|---|---|
| Acrylonitrile | 65 |
| N-Isopropenylphenyl-N',N'-ethyleneurea | 35 | yield a clear solution after heating together for a brief period. Upon heating on a steam bath for about 30 minutes, the solution polymerizes to a soft gel. Upon further heating the copolymer of the acrylonitrile and cyclic ethylene compound hardens, and at the end of 4 hours' heating is a clear reddish-brown material.

EXAMPLE 12

| | Parts |
|---|---|
| Ethyl acrylate | 70.0 |
| Acrylonitrile | 20.0 |
| N-Isopropenylphenyl-N',N'-ethyleneurea | 10.0 |
| Alpha,alpha'-bis-azoisobutyronitrile | .5 |
| Toluene | 50.0 |

The solution of the above ingredients is heated in a closed reaction vessel placed in a boiling methanol vapor bath. After heating for 8 minutes the solution gradually becomes turbid and then forms an insoluble copolymer of ethyl acrylate, acrylonitrile and the cyclic ethylene compound. Heating is continued for a total of 2 hours, at the end of which period the soft, white copolymer of these comonomers is separated from the reaction mass. It is insoluble in hot dioxane and in hot benzonitrile, as well as in cyanomorpholine at 150° C.

EXAMPLE 13

This example illustrates the preparation of various copolymers of acrylonitrile and N-isopropenylphenyl-N',N-ethyleneurea, using various proportions of these comonomers and various polymerization conditions. More particularly the example illustrates the production of such copolymers using a combination of potassium persulfate and sodium bisulfite as a "redox" catalyst system and carrying out the polymerization reaction in aqueous ethanol solution.

In a typical embodiment of the procedure employed in this example, 0.1 g. N-isopropenylphenyl-N',N'-ethyleneurea is dissolved in 75 ml. of ethanol and added to a 3-necked reaction vessel, after which 200 ml. of water is added in small portions while stirring the mixture. Fifteen (15) g. of acrylonitrile is dissolved in the mixture, after which nitrogen gas is passed over the surface of the solution to remove oxygen from the reaction vessel. The passage of nitrogen gas is continued during the reaction period in order to be sure that the polymerization reaction is carried out in an inert atmosphere. The polymerization reaction begins when a solution of 0.23 g. of sodium bisulfite in 10 ml. of water and 0.60 g. of potassium persulfate in 15 ml. of water are added in that order. The mixture is stirred and kept at a temperature of 30–35° C. for a total of 4 or 5 hours. At the end of the reaction period the copolymer is separated by filtration, washed first with water and then with methanol, and is finally dried to a constant weight at 70–80° C. The results of a series of such copolymerization reactions are shown in Table I. The acrylonitrile is used in a concentration corresponding to 5 g. of acrylonitrile per 100 ml. of approximately 25% aqueous ethanol.

TABLE I

| Wt. ratio IPPEU:AN | Temp., °C. | Conc., g./l. K$_2$S$_2$O$_8$ | Conc., g./l. NaHSO$_3$ | Time, hrs. | $\eta_{sp_{1\%}}$ |
|---|---|---|---|---|---|
| 1:150 | 30 | 2.00 | 0.77 | 4 | 0.91 |
| 1:150 | 30–35 | 2.00 | .77 | 4 | .77 |
| 1:150 | 50 | .62 | .23 | 5 | .61 |
| 1:50 | 30 | 2.00 | .77 | 4 | |

In Table I the abbreviation "IPPEU" means N-isopropenylphenyl-N',N'-ethyleneurea and "AN" means acrylonitrile. The values for specific viscosity given in the last column of the table are the specific viscosities of solutions of 1 g. of the copolymer dissolved in 100 ml. of a 55% aqueous solution of sodium thiocyanate.

EXAMPLE 14

This example illustrates the preparation of copolymers of acrylonitrile and N-isopropenylphenyl-N',N'-ethyleneurea by solution polymerization technique using alpha,alpha'-bis-azoisobutyronitrile as a polymerization catalyst and toluene as a solvent. The conditions and results are tabulated in Table II. The abbreviations "IPPEU" and "AN" have the same meanings as given above with reference to Table I.

TABLE II

| Wt. ratio IPPEU:AN | Temp., °C. | Catalyst, g./l. | AN in g./100 ml. of total sol'n. | Results |
|---|---|---|---|---|
| 1:56 | 65 | 2.0 | 56 | Started to copolymerize after 1 hr.; low yield. |
| 1:48 | 65 | 2.0 | 48 | Copolymerized after 1.3 hrs. |
| 1:40 | 65 | 2.0 | 40 | Solid copolymer when removed after 2.5 hrs. |

EXAMPLE 15

This example illustrates the production of copolymers of acrylonitrile and allyl-N,N-ethylene carbamate. The general procedure is essentially the same as that given under Example 13 with reference to the production of copolymers of acrylonitrile and N-isopropenylphenyl-N',N'-ethyleneurea, but differs therefrom in that water alone is the liquid medium in which the reaction is effected. In this example the redox catalyst system comprises 1.83 g. per liter of potassium persulfate and 0.71 g. per liter of sodium bisulfite, and the acrylonitrile is employed in a concentration of 4.62 g. per 100 ml. of total solution. The reaction is carried out, with stirring, for 4 hours at 30–35° C. The results are summarized below:

TABLE III

| Weight ratio of allyl-N, N-ethylene carbamate to acrylonitrile | Yield in percent |
|---|---|
| 1:188 | 35 |
| 1:94 | 35 |

EXAMPLE 16

This example illustrates the preparation of copolymers of acrylonitrile and N-allyl-N',N'-ethyleneurea. The procedure is essentially the same as that described under Example 13 with reference to the production of copolymers of acrylonitrile and N-isopropenylphenyl-N',N'-ethyleneurea, but differs therefrom in that, as in Example 15, water alone is the liquid medium in which the reaction is effected. The details of the polymerization conditions and the results obtained are given in Table IV.

TABLE IV

| Wt. ratio AEU:AN | g. per liter | | Conc. of monomers, in g./100 ml. of total sol'n. | Time, hr. | Temp., °C. | Yield, percent | $\eta_{sp_{1\%}}$ |
|---|---|---|---|---|---|---|---|
| | K$_2$S$_2$O$_8$ | NaHSO$_3$ | | | | | |
| 1:250 | 1.83 | 0.71 | 4.62 | 4 | 30-35 | 36 | >30 |
| 1:250 | 3.70 | 1.42 | 4.62 | 4 | 50 | 85 | 2.11 |
| 1:250 | 3.70 | 1.42 | 4.62 | 4 | 35 | 38 | |
| 1:250 | 1.81 | .71 | 4.62 | 4 | 50 | 73 | 9.52 |
| 1:250 | .92 | .36 | 4.62 | 6 | 50 | 76 | 12.5 |
| 1:250 | 3.70 | 1.42 | 4.62 | 7 | 50 | 83 | 15.7 |
| 1:125 | 1.50 | .58 | 1.88 | 7 | 50 | 66 | .62 |

In Table IV the abbreviaton "AEU" means N-allyl-N',N'-ethyleneurea and "AN" means acrylonitrile.

EXAMPLE 17

| | Parts |
|---|---|
| Acrylonitrile | 49.9 |
| N-allyl-N',N'-ethyleneurea | .53 |
| Methyl acrylate | 2.65 |
| Water | 900.00 |
| 6 N sulfuric acid | .7 |
| Ammonium persulfate in 50 parts of water | 1.71 |
| Sodium meta-bisulfite in 50 parts of water | .36 |

A reaction vessel, equipped with a stirrer, reflux condenser, thermometer and gas-inlet tube, is placed in a water bath maintained at a temperature of 30-35° C. A solution of all of the above ingredients, with the exception of the acrylonitrile, methyl acrylate, ammonium persulfate and sodium meta-bisulfite, is added to the reaction vessel. A rapid stream of pre-purified nitrogen is passed over the surface of the solution for 30 minutes. The nitrogen flow is then reduced to one bubble per second. The remaining ingredients are added, and the reaction is allowed to proceed at about 35° C., while continuing the stirring, for a total of about 6 hours. The resulting copolymer of acrylonitrile, methyl acrylate and N-allyl-N',N'-ethyleneurea is collected on a Büchner funnel, washed with 2000 parts of deionized water, and dried in an oven at 70° C. for about 16 hours. This copolymer is suitable for use in production of a fiber having improved dye receptivity, especially toward acid dyes, as compared with a similar acrylonitrile-methyl acrylate copolymer in which no N-allyl-N',N'-ethyleneurea is present.

It will be understood, of course, by those skilled in the art that our invention is not limited to the specific ingredients named in the above illustrative examples nor to the particular proportions and methods of copolymerization mentioned therein. Thus, instead of the particular catalyst or reduction-oxidation (redox) catalyst system named in the different examples, any other polymerization catalyst or combination of polymerization catalysts, numerous examples of which have been given hereinbefore, can be used.

Likewise, other modifying comonomers, in addition to the ethyl acrylate named in Example 12 and the methyl acrylate of Example 17, can be used. Illustrative examples of such comonomers are vinyl compounds which are different from acrylonitrile (vinyl cyanide), including the vinyl aromatic compounds, more particularly the vinyl aromatic hydrocarbons (e. g., styrene, isopropenyl toluene, the various dialkyl styrenes, etc.), other aliphatic compounds containing a $CH_2=C<$ grouping, e. g., the various substituted acrylonitriles (e. g., methacrylonitrile, ethacrylonitrile, phenylacrylonitrile, etc.), acrylamide, and the various substituted acrylamides (e. g., methacrylamide, ethacrylamide, the various N-substituted acrylamides and the various N-substituted alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid, more particularly the alkyl esters of acrylic acid, e. g., the ethyl, propyl, isopropyl, n-butyl, isobutyl, sec.-butyl, tert.-butyl, amyl, hexyl, heptyl, octyl, decyl, dodecyl, etc., esters of acrylic acid, including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

The proportions of any modifying comonomer or comonomers that are incorporated in the polymerizable composition together with the acrylonitrile and the cyclic ethylene compound of the kind embraced by Formula I can be varied as desired or as conditions may require. Ordinarily, however, the acrylonitrile constitutes a major or preponderant proportion (more than 50%) by weight of the total weight of monomers to be copolymerized, the cyclic ethylene compound constitutes from about 0.4% to about 35%, more particularly from about 1 or 2% to about 20 or 25%, of the total weight of the acrylonitrile and cyclic ethylene compound, and any modifying comonomer or comonomers (if present in the polymerizable mixture) constitute the remainder of the total amount of comonomers which are subjected to copolymerization. In the preferred copolymer compositions (more particularly thermoplastic copolymer compositions) of the present invention, the acrylonitrile is employed in the mixture of comonomers in an amount such that at least 85% by weight of combined acrylonitrile is present in the copolymer.

Although the new copolymers of this invention are particularly useful in the formation of fibers or filaments which are more amenable to dyeing than homopolymeric acrylonitrile, they also have numerous other applications in the plastics and coating arts. For instance, with or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of our invention can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

The present invention provides acrylonitrile copolymer compositions in which a cyclic ethylene compound is an integral part of the copolymer molecule, as evidenced by the fact that the copolymer is reactive with compounds containing an active hydrogen atom, e. g., alcohols and amines, so that the ring is opened and ethers or secondary or tertiary amines are formed. In this way, a modified copolymer can be produced in which a significant number of basic groups (resulting from the ring opening) are present, thereby further enhancing the dye receptivity (especially toward acid dyes) of the copolymer.

Another advantage flowing from the copolymers of the present invention resides in the fact that, because of their reactivity with amines and other compounds containing an active hydrogen atom, products having improved physical properties, e. g., higher softening point, as compared with the initial copolymer, can be produced. The introduction of the cyclic ethylene linkages into the acrylonitrile copolymer molecule provides functional groups therein that can serve as anchors for subsequent cross-linkage with amines and other compounds containing an active hydrogen atom. These anchoring groups can serve either as a means of insolubilizing the copolymer or as a point of reaction with reactive dyes or other substances containing reactive groups. Since the copolymers of the invention, and fibers produced therefrom, are amenable to "animalization," as by the introduction of amine groups, "animalized" products can be produced that are readily and deeply dyed with dyes such as are used in dyeing wool, e. g., acid dyes.

We claim:

1. A polymerizable composition comprising (1) acrylonitrile and (2) a compound represented by the general formula

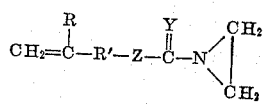

where R represents a member of the class consisting of hydrogen and the methyl radical, R' represents a divalent hydrocarbon radical, Z represents a member of the class consisting of oxygen and the imino radical, and Y represents a member of the class consisting of oxygen and sulfur, the compound of (2) constituting from about 0.4% to about 35% by weight of the total amount of (1) and (2).

2. A composition as in claim 1 wherein Y represents oxygen.

3. A composition as in claim 1 wherein Y represents sulfur.

4. A composition as in claim 1 wherein Z represents oxygen.

5. A composition as in claim 1 wherein Z represents an imino radical.

6. A product comprising the polymerized composition of claim 1.

7. A composition comprising a copolymer of copolymerizable ingredients including (1) acrylonitrile and (2) a compound represented by the general formula

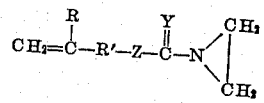

where R represents a member of the class consisting of hydrogen and the methyl radical, R' represents a divalent hydrocarbon radical, Z represents a member of the class consisting of oxygen and the imino radical, and Y represents a member of the class consisting of oxygen and sulfur, the compound of (2) constituting from about 1% to about 15% by weight of the total amount of (1) and (2).

8. A composition comprising a copolymer as in claim 7 wherein R' represents a divalent aliphatic hydrocarbon radical.

9. A composition comprising a copolymer as in claim 7 wherein R' represents a divalent aromatic hydrocarbon radical.

10. A composition comprising a copolymer of copolymerizable ingredients including (1) acrylonitrile and (2) allyl-N,N-ethylene carbamate, the compound of (2) constituting from about 1% to about 15% by weight of the total amount of (1) and (2).

11. A composition comprising a copolymer of copolymerizable ingredients including (1) acrylonitrile and (2) N-allyl-N',N'-ethyleneurea, the compound of (2) constituting from about 1% to about 15% by weight of the total amount of (1) and (2).

12. A composition comprising a copolymer of copolymerizable ingredients including (1) acrylonitrile and (2) N-allyl-N',N'-ethylenethiourea, the compound of (2) constituting from about 1% to about 15% by weight of the total amount of (1) and (2).

13. A composition comprising a copolymer of copolymerizable ingredients including (1) acrylonitrile and (2) N-isopropenylphenyl-N',N'-ethyleneurea, the compound of (2) constituting from about 1% to about 15% by weight of the total amount of (1) and (2).

14. The method of preparing a new synthetic composition which comprises polymerizing, in a liquid medium in which the polymerizable ingredients are inert and with the aid of a polymerization catalyst, a mixture of copolymerizable ingredients including (1) acrylonitrile and (2) a compound represented by the general formula

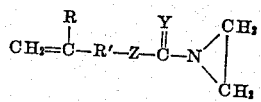

where R represents a member of the class consisting of hydrogen and the methyl radical, R' represents a divalent hydrocarbon radical, Z represents a member of the class consisting of oxygen and the imino radical, and Y represents a member of the class consisting of oxygen and sulfur, the compound of (2) constituting from about 0.4% to about 35% by weight of the total amount of (1) and (2), and isolating the resulting copolymer from the said liquid medium.

EDWARD L. KROPA.
EARL W. MALMBERG.

References Cited in the file of this patent

UNITED STATES PATENTS

| Number | Name | Date |
|---|---|---|
| 2,544,638 | Caldwell | Mar. 13, 1951 |